United States Patent [19]

Kaku et al.

[11] Patent Number: 5,105,409
[45] Date of Patent: Apr. 14, 1992

[54] METHOD AND APPARATUS FOR OPTICAL RECORDING AND REPRODUCTION WITH TRACKING SERVO REDUCING TRACK OFFSET

[75] Inventors: Toshimitsu Kaku, Sagamihara; Kazuo Shigematsu, Saitama; Hisataka Sugiyama, Tokyo; Takeshi Maeda, Kokubunji; Masahiro Takasago, Odawara, all of Japan

[73] Assignee: Hitachi, Ltd., Tokyo, Japan

[21] Appl. No.: 230,971

[22] Filed: Aug. 11, 1988

[30] Foreign Application Priority Data

Aug. 19, 1987 [JP] Japan .................. 62-204007

[51] Int. Cl.$^5$ .................................. G11B 7/095
[52] U.S. Cl. .................. 369/44.31; 369/44.33; 369/44.35; 369/44.42
[58] Field of Search .... 369/44.27, 44.29, 44.31–44.36, 369/44.39, 44.42, 105, 106

[56] References Cited

U.S. PATENT DOCUMENTS

| | | | |
|---|---|---|---|
| 4,651,314 | 3/1987 | Yoshikawa et al. | 369/58 X |
| 4,742,505 | 5/1988 | Takeuchi et al. | 369/44.36 |
| 4,748,609 | 5/1988 | Yonezawa et al. | 369/44.36 X |
| 4,751,695 | 6/1988 | Kaku et al. | 369/44.32 X |
| 4,774,698 | 9/1988 | Henmi et al. | 369/44.36 X |
| 4,785,442 | 11/1988 | Ohtake et al. | 369/44.32 X |
| 4,807,210 | 2/1989 | Kaku et al. | 369/44.31 X |
| 4,819,220 | 4/1989 | Miyazaki et al. | 369/44.29 X |

Primary Examiner—Roy N. Envall, Jr.
Assistant Examiner—W. R. Young
Attorney, Agent, or Firm—Antonelli, Terry, Stout & Kraus

[57] ABSTRACT

Disclosed is an optical recording and reproducing apparaus comprising a light source directing a light spot toward a recording medium, a detection system detecting light reflected from the recording medium to derive an electrical signal from the reflected light, an information processing circuit modulating the intensity of the light spot according to writing pulses to record information on the recording medium and using the electrical signal to reproduce information from the recording medium, and a tracking servo circuit carrying out tracking servo operation on the basis of the electrical signal and including an extracting circuit connected to a source of extracting pulses having a pulse width at least equal to the writing pulse width so that writing pulse parts contained in the electrical signal are extracted during recording information, whereby a track offset occurring during information recording can be minimized, and the stability of the tracking servo system can be improved.

11 Claims, 4 Drawing Sheets

METHOD AND APPARATUS FOR OPTICAL RECORDING AND REPRODUCTION WITH TRACKING SERVO REDUCING TRACK OFFSET

BACKGROUND OF THE INVENTION

This invention relates to a method and apparatus using a light spot for recording and reproducing information on and from a track on a recording medium, and more particularly to an optical information retrieving system which minimizes an adverse effect of a track offset that may occur during recording and improves the characteristics of a tracking servo system at the time of recording. The present invention is preferably applicable to a write-once-read-many type optical disk apparatus capable of additional recording of information.

Such a write-once-read-many type optical disk apparatus can record a large amount of information on an optical disk by directing a light spot from an optical head toward the optical disk and locally fusing a recording film by the heat of the light spot thereby forming pits in the recording film. However, the write-once-read-many type optical disk apparatus has such a problem that, depending on the characteristics of the optical head and optical disk, information cannot be normally recorded when a track offset occurs during recording information.

As a tracking method applicable to such an optical disk apparatus, there is a push-pull method which attains tracking utilizing light reflected and diffracted from a track guide groove (a pre-groove). It is known that, when this push-pull method is used, tracking operation tends to become unstable if a track offset occurs due to inclination of an optical disk or movement of a light beam. Provision of correction marks such as mirror marks in each track guide groove so as to prevent the unstable tracking operation is described in U.S. Pat. No. 4,663,751 and U.S. patent application Ser. No. 870,944 now U.S. Pat. No. 4,751,695. Also, provision of correction marks such as prewobbled pits in each track guide groove is described in U.S. patent application Ser. No. 845,340 now U.S. Pat. No. 4,748,609. These methods intend to stabilize the tracking control by detecting a track offset component from the correction marks such as the mirror marks or prewobbled pits and adding or subtracting the detected track offset component to or from an output signal of a guide-groove-based tracking servo signal thereby correcting the tracking error. Further, U.S. patent application Ser. No. 071,183 now U.S. Pat. No. 4,807,210 proposes a method in which a tracking error attributable to a track offset component detected from correction marks such as mirror marks or prewobbled pits is corrected in the read mode only, and, in the write mode or erase mode, the correction marks are used for detection of a track offset component, and the recording operation and erasing operation are controlled depending on the output level of the track offset component so as to prevent erroneous recording of information or erroneous erasing or insufficient erasing of data recorded already.

However, none of the prior art disclosures described above refers to the problem of occurrence of a track offset attributable to a pulse-like increase in the intensity of the light spot emitted during recording information.

SUMMARY OF THE INVENTION

It is an object of the present invention to provide an optical recording and reproducing method and apparatus in which a track offset occurring during recording information on an optical disk is minimized so as to improve the stability of a tracking servo system.

According to the present invention which attains the above object, writing pulse parts contained in a tracking servo signal detected during recording information are extracted by means of extracting pulses having a pulse width corresponding to that of writing pulses.

When the push-pull method is used for detecting a tracking servo signal at the time of information recording, a track offset appears when an optical head or an optical disk has not satisfactory characteristics. That is, such a track offset occurs when an unbalance occurs in writing pulse parts reflected from the optical disk at the time of information recording. Therefore, when the reflected unbalanced writing pulse parts contained in the tracking servo signal at the time of information recording are extracted, with the timing of writing pulses, by means of extracting pulses having a pulse width at least equal to that of the writing pulses or a pulse width determined while taking into account the frequency characteristics of the tracking servo signal, the track offset appearing at the time of information recording can be minimized, and the performance of the tracking servo system can be greatly improved.

DESCRIPTION OF THE PREFERRED EMBODIMENTS

A preferred embodiment of the present invention will now be described with reference to FIG. 1.

Figure 1:
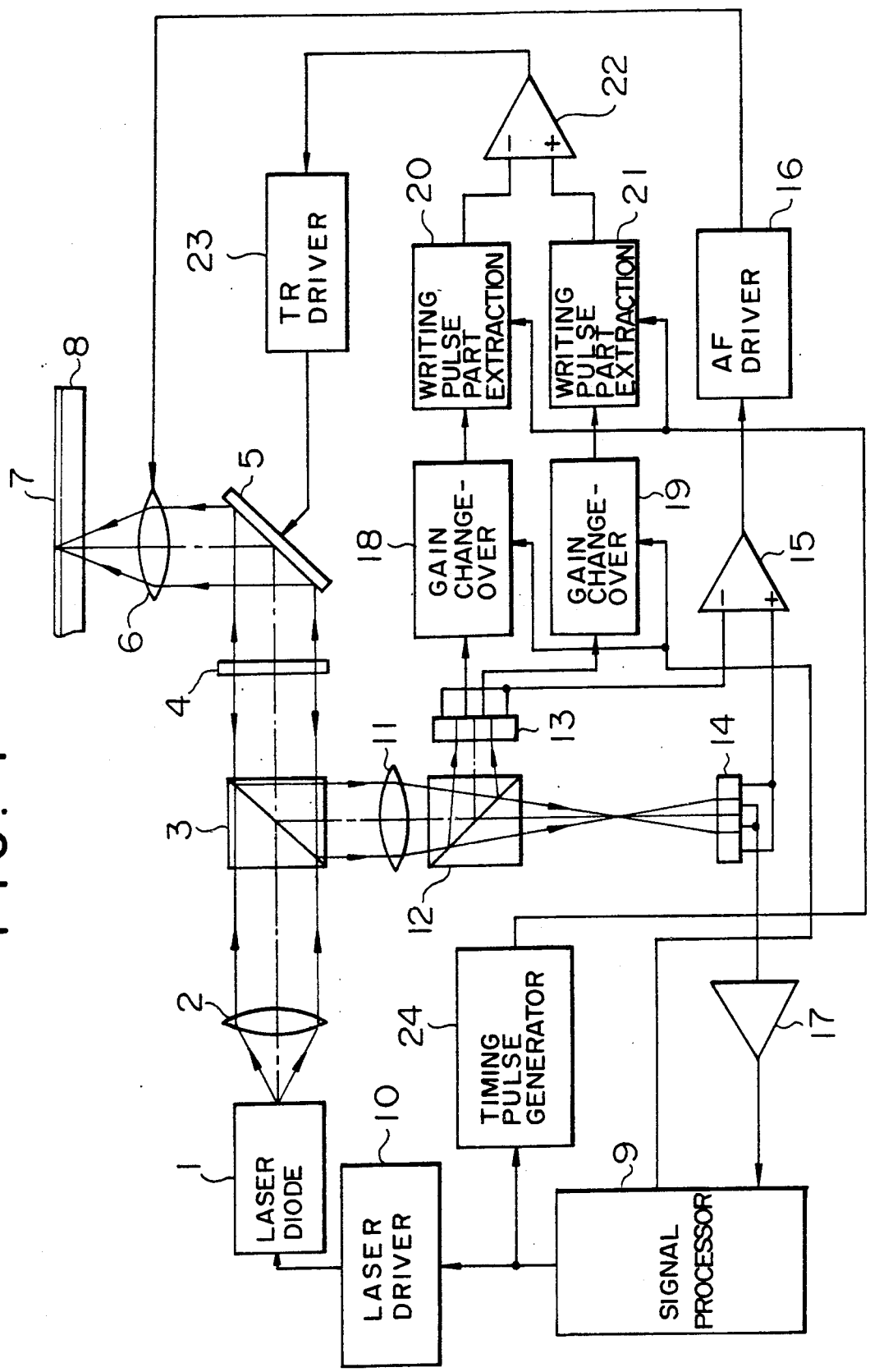
FIG. 1 is a block diagram showing the structure of an embodiment of the optical recording and reproducing apparatus according to the present invention.

FIG. 1 shows the structure of a write-once-read-many type optical disk apparatus which can record and reproduce a large amount of information on and from an optical disk by, for example, forming pits. Referring to FIG. 1, a light beam emitted from a laser diode 1 is turned into a parallel beam by a coupling lens 2, and the parallel beam passes through a polarization prism 3. The light beam passed through the polarization prism 3 is linearly polarized. This linearly polarized light passes through a quarter wave plate 4 to be turned into circularly polarized light. After passing through a galvano mirror 5, the circularly polarized light is converged into a light spot having a diameter of about 1 μm by a focusing lens 6 mounted on a voice coil motor, and the minute light spot is focused on a recording medium 7 formed on a disk plate 8 to constitute an optical disk. An amorphous Te-Se alloy is well known as the material of the recording medium 7 of the optical disk used in the write-once-read-many type optical disk apparatus. A polycarbonate plate is most frequently used to provide the disk plate 8 having the recording medium 7, from the viewpoints of cost and mass-productivity.

For the purpose of recording information, a writing pulse signal is generated from a signal processing circuit 9 provided for management and modulation/demodulation of data to be recorded. The writing pulse signal is applied to a laser driver 10, and the laser driver 10 causes high power oscillation of the laser diode 1 in a pulsating fashion. The heat of the laser beam emitted from the laser diode 1 acts to locally fuse the recording medium 7 to form pits in the recording medium 7 thereby recording the information on the optical disk.

Figure 2:
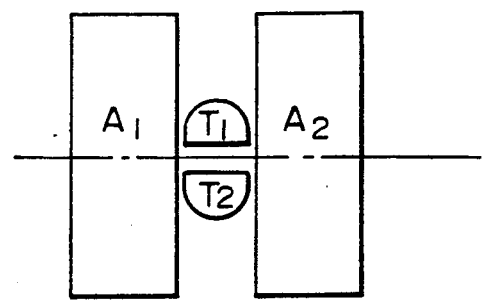
FIG. 2 shows schematically the structure of one form of the light detector employed in the present invention for detecting deviation of the light spot from a track and for detecting an information signal.

The light reflected from the recording medium 7 passes through the focusing lens 6 and the galvano mirror 5 again and passes then through the quarter wave plate 4 to be turned into linearly polarized light from circularly polarized light. Then, the optical path of the light is diverted by the polarization prism 3. After passing through a lens 11, the diverted light is divided into two light beams by a half prism 12. The light beam reflected by the half prism 12 is incident on a first light detector 13 disposed on the upstream side of the focal point of the lens 11, while the light beam transmitted through the half prism 12 is incident on a second light detector 14 disposed on the downstream side of the focal point of the lens 11. The first and second light detectors 13 and 14 have the same shape. FIG. 2 shows the arrangement of elements constituting each of these light detectors 13 and 14. Light detecting elements $A_1$ and $A_2$ disposed at both ends respectively are used for the purpose of focusing error detection (AF), while intermediate light detecting elements $T_1$ and $T_2$ are used for the dual purposes of tracking error detection (TR) and information signal detection (RD).

When the disk plate 8 tilts in the vertical direction, and out-of-focus or de-focus results, the light beams of shapes different from each other depending on the direction of the de-focus are incident on the first and second light detectors 13 and 14, and these light detectors 13 and 14 receive different quantities of light respectively.

The operation of the focusing servo in the apparatus of the present invention is such that, after the outputs of the light detecting elements $A_1$ and $A_2$ of each of the first and second light detectors 13 and 14 are added, the resultant outputs of the first and second light detectors 13 and 14 are applied to a differential amplifier 15 to derive an AF error signal from the differential amplifier 15, and the AF error signal is applied to an AF driver circuit 16, so that the focusing lens 6 mounted on the voice coil motor can follow up the vertical tilting movement of the disk plate 8.

The information reproducing operation in the apparatus of the present invention is such that the outputs of the light detecting elements $T_1$ and $T_2$ of the second light detector 14 are added to obtain a reproduced signal representing the quantities of light reflected from the recording medium 7 depending on the presence or absence of pits on the recording medium 7, and, after amplifying the reproduced signal by an amplifier 17, the output signal of the amplifier 17 is applied to the signal processing circuit 9 in which the signal is converted into a pulse signal so as to demodulate the recorded data.

In the tracking servo employed in the apparatus of the present invention, the push-pull method is used for the purpose of tracking error detection. Basically, the light detecting elements $T_1$ and $T_2$ of the first light detector 13 are disposed in such a relation that a track (a guide groove) formed on the disk plate 8 is located between the light detecting elements $T_1$ and $T_2$. An unbalance occurs in the diffracted light beam when the light spot deviates from the center of the track, and the difference between the outputs of the light detecting elements $T_1$ and $T_2$ in such a case is detected by a second differential amplifier 22 to obtain a tracking servo signal. This tracking servo signal is applied to a TR driver circuit 23 which drives the glavano mirror 5, so that the light spot can follow up the center of the track.

However, in the case of an on-land recording method in which information is recorded on a land between the guide grooves (pre-grooves) previously formed on the disk plate 8, an unbalance dependent upon the characteristics of the optical head and optical disk occurs in the writing pulse parts contained in the reflected light incident on the light detecting elements $T_1$ and $T_2$ during information recording, and such a problem arises in which the recording operation cannot be normally carried out due to an offset occurred in the tracking servo signal.

Figure 3:
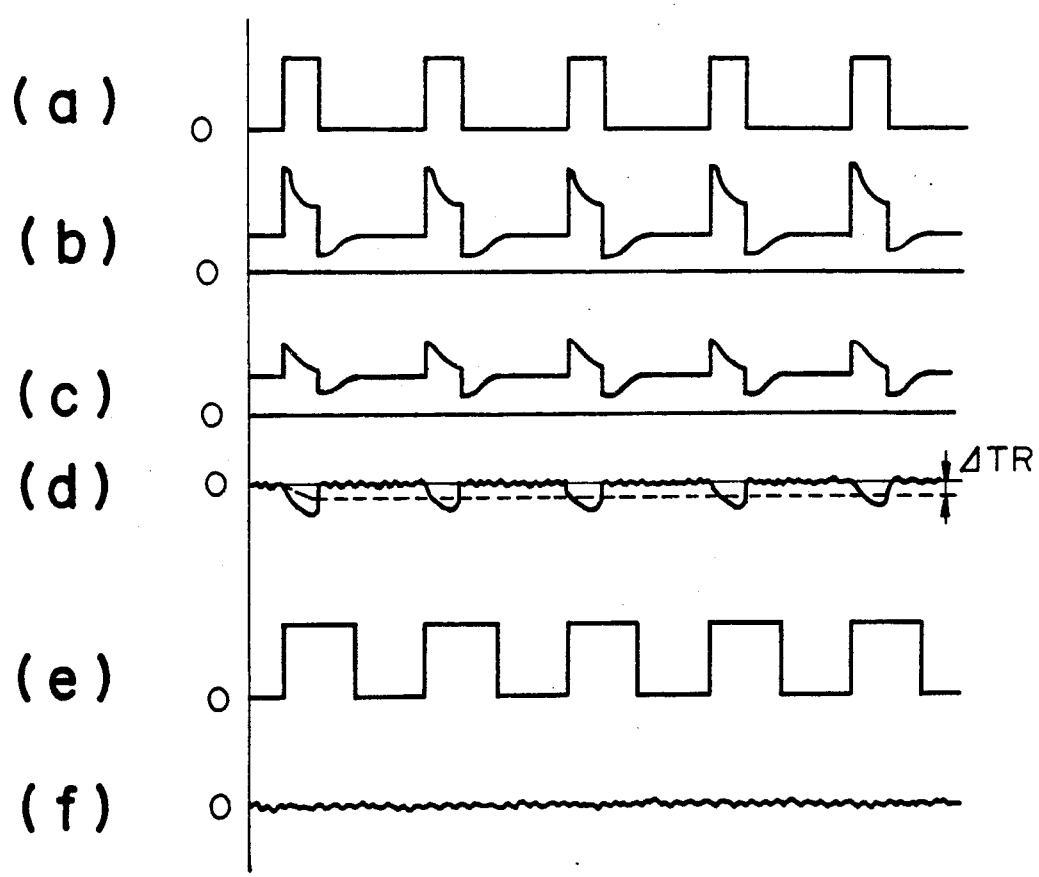
FIGS. 3(a) to 3(f) are waveform diagrams for illustrating the operation of the apparatus of the present invention.
Figure 4:
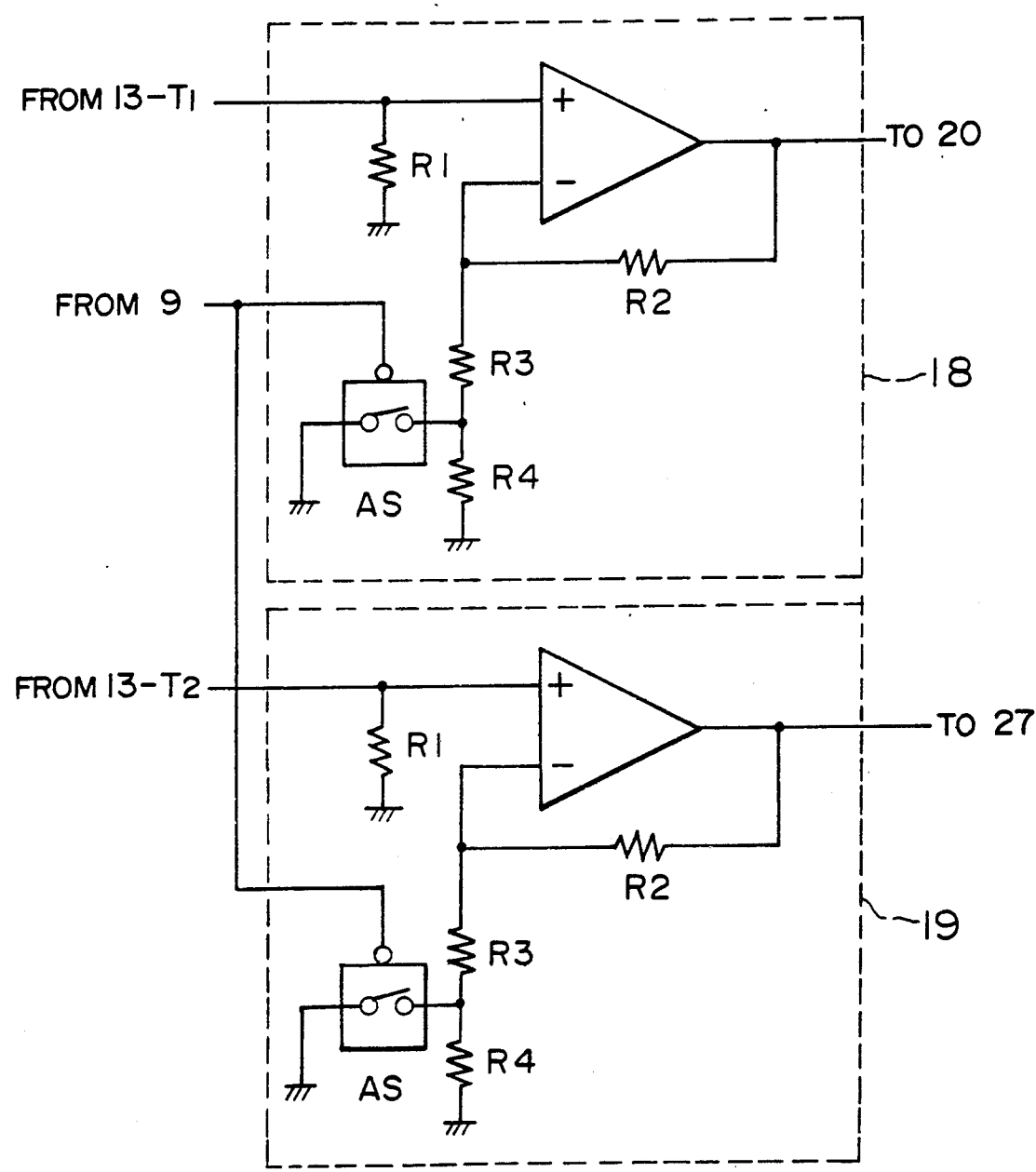
FIG. 4 is a circuit diagram showing the structure of one form of the gain change-over circuit employed in the present invention.

The state of writing pulse parts contained in reflected light during information recording will be described with reference to FIG. 3, and how to solve the problem of the impossibility of normally carrying out the recording operation will be described in detail with reference to FIGS. 4 and 5. FIG. 3(a) shows a writing pulse signal driving the laser diode 1, and the laser beam is intensity modulated according to information to be recorded. In response to the application of the writing pulse signal shown in FIG. 3(a), reflected light beams as, for example, shown in FIGS. 3(b) and 3(c) are detected by the light detecting elements $T_1$ and $T_2$ of the first light detector 13 respectively. When, in this case, the frequency characteristics of the TR detection system are ideal, the differential amplifier 22 generates an output waveform as shown by the solid lines in FIG. 3(d). However, because the actual frequency characteristics of the TR detection system are sufficiently low as compared to the recording frequency, the output of the differential amplifier 22 has an average level as shown by the dotted line in FIG. 3(d), and this level appears as a track offset $\Delta TR$. In order to minimize such a track offset appearing during the information recording operation, the present invention provides means for extracting, from the TR detection system, the writing pulse parts which are the source of occurrence of the track offset. Amplifiers 18 and 19 shown in FIG. 1 are provided for changing over between the gain in the write mode and that in the read mode. Amplifiers 20 and 21 shown in FIG. 1 are provided for extracting the writing pulse parts. FIG. 4 shows the practical structure of the amplifiers 18 and 19. Referring to FIG. 4, the outputs of the light detecting elements $T_1$ and $T_2$ of the first light detector 13 are applied to non-inverting amplifiers $OP_1$ after being voltage-converted by resistors $R_1$ respectively. The gain of each of the non-inverting amplifiers $OP_1$ is determined by resistors $R_2$, $R_3$ and $R_4$. In the read mode, a gain change-over control signal applied to an analog switch AS is in its low level, and the analog switch AS is turned on so as to ground the resistor $R_3$. Thus, in the read mode, the gain $Gr$ is given by $Gr = 1 + (R_2/R_3)$. On the other hand, in the write mode, the laser diode 1 makes high power pulse oscillation, and the quantity of reflected light increases. Therefore, it is necessary to change over the gain of each inverting amplifier $OP_1$ so that the gain of the TR detection system can be maintained constant. Thus, in the write mode, the gain change-over signal applied from the signal processing circuit 9 is turned into its high level to turn off the analog switch AS, and the gain Gw is decreased to $Gw=1+(R_2(R_3+R_4))$.

Figure 5:
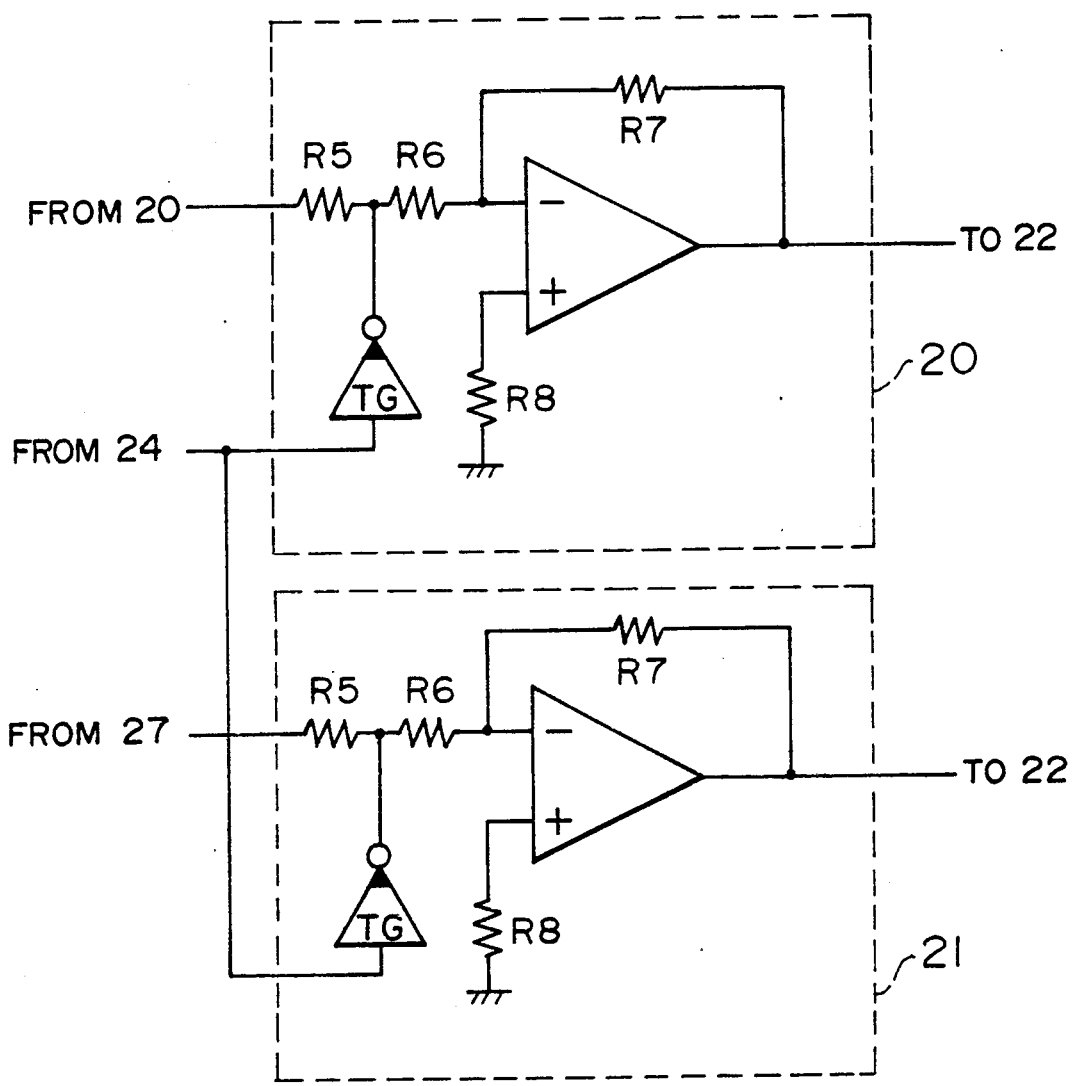
FIG. 5 is a circuit diagram showing the structure of one form of the writing pulse parts extracting circuit employed in the present invention.

FIG. 5 shows the practical structure of the amplifiers 20 and 21. Referring to FIG. 5, the outputs of the amplifiers 18 and 19 are applied to the amplifiers 20 and 21 respectively, and a timing pulse generating circuit 24 shown in FIG. 1 applies an extracting pulse signal to the amplifiers 20 and 21 to extract the writing pulse parts contained in the outputs of the amplifiers 18 and 19. Extraction of the writing pulse parts will be described with reference to FIG. 3 again. FIG. 3(e) shows the waveform of the extracting pulse signal applied from the timing pulse generating circuit 24. It will be seen in FIG. 3(e) that the pulse width of each extracting pulse is such that the pulse width of each writing pulse is suitably extended taking into account the frequency characteristic of the TR detection system. Referring to FIG. 5 again, the extracting pulse is applied to an open-collector output TTL gate TG (for example, that sold under the trade name of SN7406) in each of the amplifiers 20 and 21, and, when the writing pulse is present, the input of the TTL gate TG is rendered null to ground the connection point between resistors $R_5$ and $R_6$ so as to extract the corresponding writing pulse part. As a result, the track offset $\Delta TR$ is eliminated as shown in FIG. 3(f), and the stability of the TR servo system in the write mode can be greatly improved. Since, in this case, the quantity of reflected light is lowered by a proportion corresponding to the duty factor of the extracting pulse, the gain Gw of the amplifiers 18 and 19 in the write mode must be selected while taking the above fact into account. In FIG. 5, the TTL gate is used to extract the writing pulse parts. However, it is apparent that the effect is equivalent to that described above even when a sample/hold circuit including means such as an analog switch is used to hold the TR detection signal for a period of time corresponding to the pulse width of the writing pulse parts by application of the extracting pulse signal.

It will be understood from the foregoing description of the present invention that, in the write mode, writing pulse parts are extracted from the TR detection system for a period of time corresponding to the writing pulse width, so that the tracking servo performance can be greatly improved.

We claim:

1. An optical recording and reproducing apparatus comprising:
   light illuminating means for illuminating a light spot toward a recording medium;
   a detection system detecting light reflected from said recording medium to derive an electrical signal from said reflected light;
   an information processing circuit modulating the intensity of said light spot according to writing pulses to record information on said recording medium and using said electrical signal to reproduce information from said recording medium; and
   a tracking servo circuit carrying out a tracking servo operation on the basis of said electrical signal, said tracking servo circuit including an extracting circuit for extracting time-wise portions of said electrical signal, and means for applying extracting pulses having a pulse width at least equal to the writing pulse width to said extracting circuit so that time-wise portions of said electrical signal corresponding to the writing pulses during recording of information are not utilized for the tracking servo operation when the extracting pulses are present.

2. An optical recording and reproducing apparatus according to claim 1, wherein the pulse width of said extracting pulses applied to said extracting circuit is determined while taking into account the frequency characteristics of a tracking servo signal of said tracking servo circuit.

3. An optical recording and reproducing apparatus according to claim 1, wherein said tracking servo circuit includes a gain change-over circuit for changing over the gain of said tracking servo circuit depending on whether information is to be recorded or reproduced.

4. An optical recording and reproducing apparatus according to claim 1, wherein the means for applying extracting pulses applies the extracting pulses to the extracting circuit at a timing corresponding to a timing of the writing pulses, the tracking servo circuit including a tracking servo loop with a variable gain.

5. An optical disk apparatus comprising:
   a light source;
   an optical system guiding light emitted from said light source toward a recording medium on a disk plate;
   an information detection circuit separating light reflected from said recording medium on said disk plate from said optical system and photoelectrically converting said reflected light into an electrical signal;
   an information processing circuit recording and reproducing information on and from said recording medium on said disk plate; and
   means connected to said information detection circuit for applying extracting pulses having a pulse width at least equal to that of writing pulses for recording of information to said information detection circuit so that time-wise portions of said electrical signal corresponding to the writing pulses during recording of information are not utilized for a tracking servo operation of a tracking servo circuit when the extracting pulses are present.

6. An optical disk apparatus according to claim 5, wherein the pulse width of said extracting pulses applied to said information detection circuit is determined while taking into account the frequency characteristics of a tracking servo signal of said tracking servo circuit.

7. An optical disk apparatus according to claim 5, wherein the means for applying extracting pulses applies the extracting pulses to said information detection circuit at a timing corresponding to a timing of the writing pulses, the tracking servo circuit including a tracking servo loop with a variable gain.

8. A method of optical recording and reproduction including the steps of directing a light spot toward a recording medium, modulating the intensity of said light spot according to writing pulses to record information on said recording medium, and detecting light reflected from said recording medium to reproduce information from said recording medium, said method comprising the step of carrying out a tracking servo operation on the basis of an electrical signal detected from said reflected light and including applying extracting pulses having a pulse width at least equal to that of said writing pulses so that time-wise portions of said electrical signal corresponding to the writing pulses during recording of information are not utilized for the tracking servo operation when the extracting pulses are present.

9. A method of optical recording and reproduction according to claim 8, wherein the pulse width of said extracting pulses is determined while taking into account the frequency characteristics of a tracking servo signal of said tracking servo operation.

10. A method of optical recording and reproduction according to claim 8, wherein the gain of a circuit carrying out said tracking servo operation is changed over depending on whether information is to be recorded or reproduced.

11. A method of optical recording and reproduction according to claim 8, wherein the applying of extracting pulses includes applying the extracting pulses at a timing corresponding to a timing of the writing pulses, the tracking servo operation providing a tracking servo loop with a variable gain.

* * * * *